US012749959B2

(12) United States Patent
Zhu et al.

(10) Patent No.: US 12,749,959 B2
(45) Date of Patent: Sep. 29, 2026

(54) SWING-ENHANCED VIBRATION ENERGY HARVESTING DEVICE

(71) Applicant: Shenzhen University, Shenzhen City (CN)

(72) Inventors: Zhengwu Zhu, Shenzhen City (CN); Junguo Xu, Shenzhen City (CN); Huiming Wu, Shenzhen City (CN)

(73) Assignee: Shenzhen University, Shenzhen City (CN)

( * ) Notice: Subject to any disclaimer, the term of this patent is extended or adjusted under 35 U.S.C. 154(b) by 170 days.

(21) Appl. No.: 18/911,541

(22) Filed: Oct. 10, 2024

(65) Prior Publication Data

US 2026/0066759 A1 Mar. 5, 2026

(30) Foreign Application Priority Data

Aug. 27, 2024 (CN) ........................ 202411179849.X

(51) Int. Cl.
*H02K 35/02* (2006.01)
*H02K 35/00* (2006.01)

(52) U.S. Cl.
CPC .................................. *H02K 35/00* (2013.01)

(58) Field of Classification Search
CPC .............................. H02K 35/00; H02K 35/02
USPC .......................................................... 310/15
See application file for complete search history.

(56) References Cited

U.S. PATENT DOCUMENTS 12,424,917 B1 * 9/2025 Deak, Sr. ................. H02K 1/34
2007/0228736 A1 * 10/2007 Smushkovich ......... F03B 15/00 290/42
2008/0303357 A1 * 12/2008 Battlogg ................ H02K 35/02 310/15

FOREIGN PATENT DOCUMENTS

CN 117614227 A * 2/2024 ............. H02K 35/02
CN 117879293 A * 4/2024 ................ H02J 3/28
WO WO-2024197983 A1 * 10/2024 ................ H02J 7/14

OTHER PUBLICATIONS

WO-2024197983-A1 Machine Translation (Year: 2024).*
CN-117879293-A Machine Translation (Year: 2024).*
CN-117614227-A Machine Translation (Year: 2024).*

* cited by examiner

*Primary Examiner* — Oluseye Iwarere
*Assistant Examiner* — Masoud Vaziri
(74) *Attorney, Agent, or Firm* — Tutunjian & Bitetto, P.C.

(57) ABSTRACT

Provided is a swing-enhanced vibration energy harvesting device including a housing, a coil assembly, and a magnetic field generator. The magnetic field generator generates a magnetic field capable of passing through the coil assembly. The coil assembly reciprocates linearly with respect to the housing and the magnetic field generator under the action of an external vibration. The coil assembly can drive the magnetic field generator to swing with respect to the coil assembly. Alternatively, the magnetic field generator reciprocates linearly with respect to the housing and the coil assembly under the action of the external vibration. The magnetic field generator can drive the coil assembly to swing with respect to the magnetic field generator.

8 Claims, 6 Drawing Sheets

SWING-ENHANCED VIBRATION ENERGY HARVESTING DEVICE

CROSS-REFERENCE TO RELATED APPLICATION

This patent application claims the benefit and priority of Chinese Patent Application No. 202411179849X filed with the China National Intellectual Property Administration on Aug. 27, 2024, the disclosure of which is incorporated by reference herein in its entirety as part of the present application.

TECHNICAL FIELD

The present disclosure relates to the technical field of vibration energy collection, and in particular to a swing-enhanced vibration energy harvesting device.

BACKGROUND

The development of the Internet of Things has stimulated extensive research on the establishment of wireless sensor networks to achieve intelligent infrastructure through data transmission. Power supply of these sensors and other devices has always been a research hotpot. Therefore, it is extremely important to collect energy from the surrounding environment in some remote areas or other areas where batteries are not easy to replace to make these areas have a self-powered system and provide sustainable off-grid power sources for intelligent infrastructure or low-power sensors and communication systems. Vibration is a basic physical phenomenon in nature. In some cases, the power requirements of sensors and other components can be satisfied by converting vibration energy into electrical energy. In general, there are many ways to convert the vibration energy into electrical energy, such as piezoelectric, capacitive, and electromagnetic ways. The capacitive energy collection needs a separate pre-charge power source, and the manufacturing process of the piezoelectric energy collection is complicated. The traditional electromagnetic power generation device is large in volume, and generates limited electromotive force, thus the power per unit area is small. The induced electromotive force generated by the electromagnetic power generation device may be insufficient if it is applied to low-frequency and micro vibration fields. However, in the traditional electromagnetic vibration energy collection device, a relative motion direction between the permanent magnet and the coil is single, and the change rate of magnetic flux is low, which limits the energy collection efficiency.

SUMMARY

An objective of the present disclosure is to provide a swing-enhanced vibration energy harvesting device, so as to solve the problems in the prior art, and improve the energy harvesting efficiency.

To achieve the objective above, the present disclosure employs the following technical solution:

The present disclosure provides a swing-enhanced vibration energy harvesting device, including a housing, a coil assembly, and a magnetic field generator. The coil assembly is movably arranged on the housing, the magnetic field generator is movably arranged on the housing and placed on one side of the coil assembly, and the magnetic field generator is configured to generate a magnetic field capable of passing through the coil assembly. The coil assembly is configured to reciprocate linearly with respect to the housing and the magnetic field generator under an action of an external vibration, so as to change magnetic flux of the coil assembly. The coil assembly is able to drive the magnetic field generator to swing with respect to the coil assembly, so as to change the magnetic flux of the coil assembly. Alternatively, the magnetic field generator is configured to reciprocate linearly with respect to the housing and the coil assembly under an action of an external vibration, so as to change magnetic flux of the coil assembly, and the magnetic field generator is able to drive the coil assembly to swing with respect to the magnetic field generator, so as to change the magnetic flux of the coil assembly.

Preferably, the coil assembly includes a magnetic flux concentrator, a coil, and a first elastic member. The coil sleeves on a middle of the magnetic flux concentrator; the first elastic member is connected to the housing and the magnetic flux concentrator; the magnetic flux concentrator is configured to be passed through by magnetic induction lines, and the coil is configured to output an induced electromotive force. The magnetic flux concentrator is configured to move linearly with respect to the housing and the magnetic field generator under the action of the external vibration and elastically deform the first elastic member. The magnetic flux concentrator is able to reciprocate linearly under the action of the external vibration and/or an action of a restoring force of the first elastic member, so as to change magnetic flux in the magnetic flux concentrator; the magnetic flux concentrator is able to drive the magnetic field generator to swing with respect to the magnetic flux concentrator, so as to change the magnetic flux in the magnetic flux concentrator. Alternatively, the magnetic field generator is configured to reciprocate linearly with respect to the housing and the magnetic flux concentrator under the action of the external vibration, so as to change magnetic flux in the magnetic flux concentrator. The magnetic field generator is able to drive the magnetic flux concentrator to rotate with respect to the magnetic field generator and elastically deform the first elastic member; and the magnetic flux concentrator is able to swing under driving of the magnetic field generator and an action of a restoring force of the first elastic member, so as to change the magnetic flux in the magnetic flux concentrator.

Preferably, the magnetic field generator includes a permanent magnet, and a second elastic member. The second elastic member is connected to the permanent magnet and the housing, and the permanent magnet is configured to generate a magnetic field capable of passing through the coil assembly. The coil assembly is configured to reciprocate linearly with respect to the housing and the permanent magnet under the action of the external vibration, so as to change the magnetic flux of the coil assembly; the coil assembly is able to drive the permanent magnet to rotate with respect to the coil assembly and elastically deform the second elastic member, and the permanent magnet is able to swing under driving of the coil assembly and action of a restoring force of the second elastic member, so as to change the magnetic flux in the coil assembly. Alternatively, the permanent magnet is configured to move linearly with respect to the housing and the coil assembly under the action of the external vibration and elastically deform the second elastic member. The permanent magnet is able to reciprocate linearly under the action of the external vibration and/or action of a restoring force of the second elastic member, so as to change the magnetic flux of the coil assembly; and the permanent magnet is able to drive the coil assembly to swing with respect to the permanent magnet, so as to change the magnetic flux of the coil assembly.

Preferably, the magnetic flux concentrator and the permanent magnet are vertically arranged. An upper end and a lower end of the permanent magnet are magnetic pole ends, which are respectively opposite to an upper end and a lower end of the magnetic flux concentrator, with a gap between each of the upper end and the lower end of the permanent magnet and a corresponding one of the upper end and the lower end of the magnetic flux concentrator. The first elastic member is arranged below the magnetic flux concentrator, and both ends of the first elastic member are connected to the magnetic flux concentrator and the housing, respectively. The second elastic member is arranged on one side, away from the magnetic flux concentrator, of the permanent magnet, and both ends of the second elastic member are connected to the permanent magnet and the housing, respectively. The magnetic flux concentrator is configured to move linearly with respect to the housing and the permanent magnet under the action of the external vibration and elastically deform the first elastic member. The magnetic flux concentrator is able to reciprocate linearly in a vertical direction under the action of the external vibration and/or the action of the restoring force of the first elastic member, so as to change the magnetic flux in the magnetic flux concentrator. The magnetic flux concentrator is able to drive the permanent magnet to rotate with respect to the magnetic flux concentrator and elastically deform the second elastic member, and the permanent magnet is able to swing in a vertical plane under driving of the magnetic flux concentrator and the action of the restoring force of the second elastic member, so as to change the magnetic flux in the magnetic flux concentrator.

Preferably, the swing-enhanced vibration energy harvesting device further includes a rigid connector. The rigid connector is connected to an upper side of the magnetic flux concentrator, and the rigid connector is configured to receive the external vibration, and drive the magnetic flux concentrator to move linearly in the vertical direction.

Preferably, the swing-enhanced vibration energy harvesting device further includes a limiting component arranged on the housing. The limiting component is configured to limit the permanent magnet in a horizontal direction perpendicular to a swing direction of the permanent magnet.

Preferably, each of the housing, the rigid connector and the limiting component is made of an aluminum alloy material, or a plastic material.

Preferably, the magnetic flux concentrator is arranged as a soft magnetic core.

Compared with the prior art, the present disclosure has the following technical effects:

According to the swing-enhanced vibration energy harvesting device provided by the present disclosure, a coil assembly and a magnetic field generator are movably arranged on the housing. The coil assembly can reciprocate linearly with respect to the housing and the magnetic field generator under the action of external vibration, in which the coil assembly moves with respect to the magnetic field generator to change the magnetic flux of the coil assembly, thus generating an induced electromotive force. The coil assembly can drive the magnetic field generator to swing with respect to the coil assembly, in which the coil assembly moves with respect to the magnetic field generator to change the magnetic flux of the coil assembly, thus generating an induced electromotive force. Alternatively, the magnetic field generator reciprocates linearly with respect to the housing and the coil assembly under the action of external vibration, in which the coil assembly moves with respect to the magnetic field generator to change the magnetic flux of the coil assembly, thus generating the induced electromotive force. The magnetic field generator can drive the coil assembly to swing with respect to the magnetic field generator, in which the coil assembly moves with respect to the magnetic field generator to change the magnetic flux of the coil assembly, thus generating the induced electromotive force. In the above two motion modes, there are two relative motion directions between the coil assembly and the magnetic field generator, i.e., a reciprocating linear motion and a relative swinging motion, which can improve the change rate of the magnetic flux to further improve the energy collection efficiency, thus further meeting the application requirements in the low-frequency and micro vibration fields.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
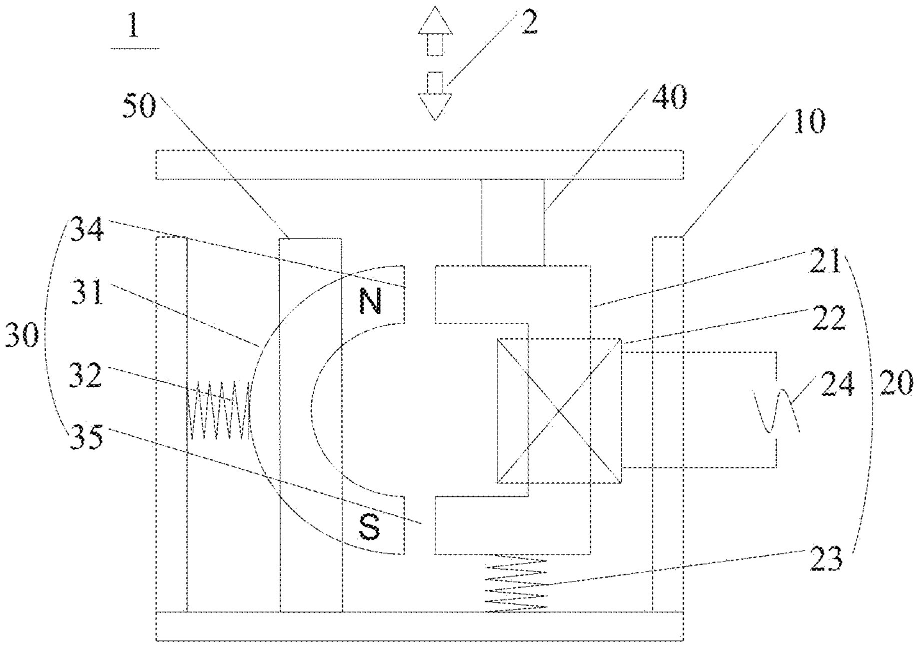
FIG. 1 is a structural schematic diagram of a swing-enhanced vibration energy harvesting device according to Embodiment 1.
Figure 2:
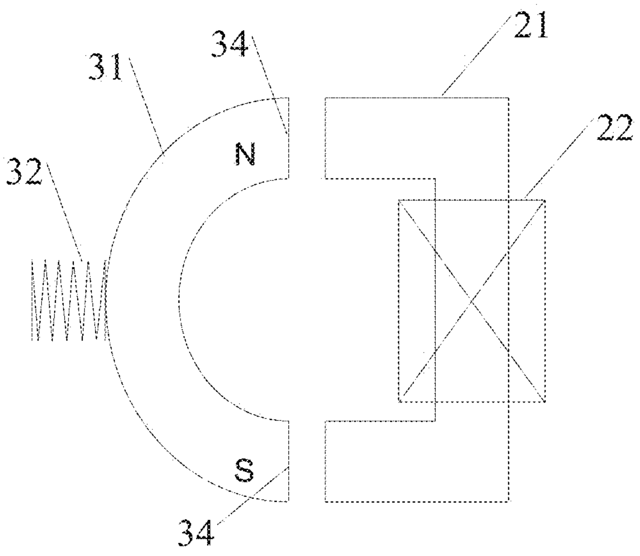
FIG. 2 is a schematic diagram of relative states of a permanent magnet and a magnetic flux concentrator according to Embodiment 1.
Figure 3:
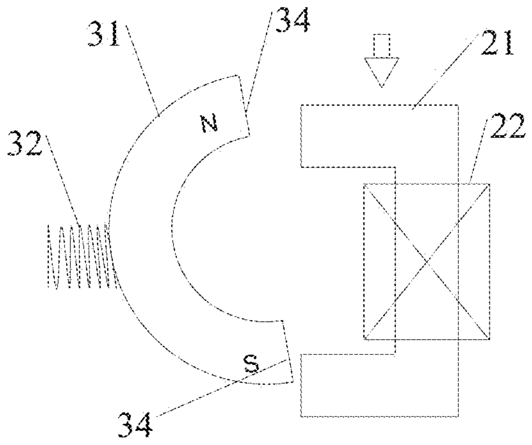
FIG. 3 is a schematic diagram of positions of a permanent magnet in an upward swinging state and a magnetic flux concentrator according to Embodiment 1.
Figure 4:
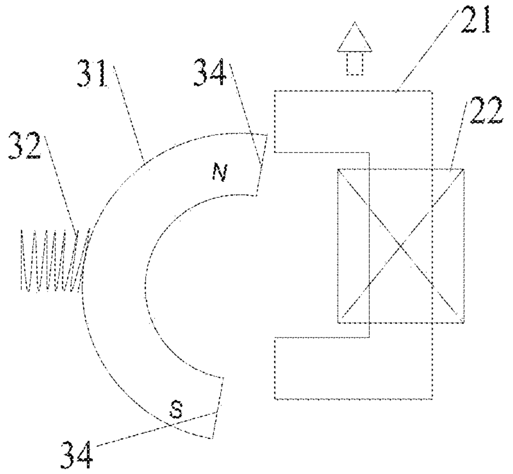
FIG. 4 is a schematic diagram of positions of a permanent magnet in a downward swinging state and a magnetic flux concentrator according to Embodiment 1.
Figure 5:
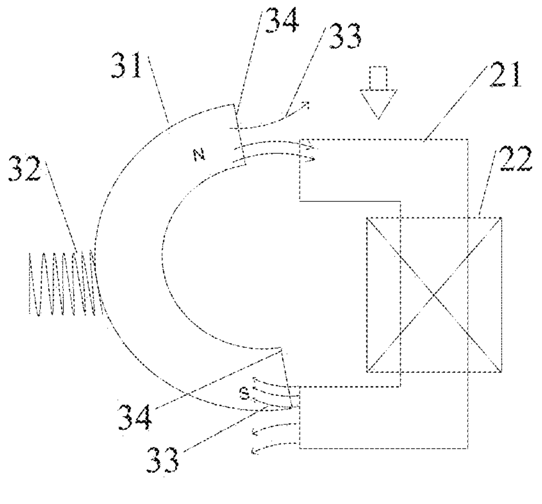
FIG. 5 is a schematic diagram of a distribution of magnetic induction lines at relative positions of a permanent magnet and a magnetic flux concentrator in FIG. 3.

In the drawings: 1 swing-enhanced vibration energy harvesting device; 10 housing; 20 coil assembly; 21 magnetic flux concentrator; 22 coil; 23 first elastic member; 24 induced electromotive force; 30 magnetic field generator; 31 permanent magnet; 32 second elastic member; 33 magnetic induction line; 34 magnetic pole end; 35 gap; 40 rigid connector; 50 limiting component; 2 external vibration.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a swing-enhanced vibration energy harvesting device, thus solving the problems existing in the prior art, and improving the energy harvesting efficiency.

In order to make the objectives, features and advantages of the present disclosure more clearly, the present disclosure is further described in detail below with reference to the accompanying drawings and specific embodiments.

Embodiment 1

This embodiment provides a swing-enhanced vibration energy harvesting device 1, referring to FIG. 1, including a housing 10, a coil assembly 20, and a magnetic field generator 30. The coil assembly 20 is movably arranged on the housing 10. The magnetic field generator 30 is movably arranged on the housing 10 and placed on one side of the coil assembly 20, and the magnetic field generator 30 is configured to generate a magnetic field capable of passing through the coil assembly 20.

Referring to FIG. 2 to FIG. 5, the coil assembly 20 can reciprocate linearly with respect to the housing 10 and the magnetic field generator 30 under the action of external vibration 2, in which the coil assembly 20 moves with respect to the magnetic field generator 30 to change the magnetic flux of the coil assembly 20, thus generating an induced electromotive force 24. The coil assembly 20 can drive the magnetic field generator 30 to swing with respect to the coil assembly 20, in which the coil assembly 20 moves with respect to the magnetic field generator 30 to change the magnetic flux of the coil assembly 20, thus generating an induced electromotive force 24. Therefore, there are two relative motion directions between the coil assembly 20 and the magnetic field generator 30, i.e., a reciprocating linear motion and a relative swinging motion, which can improve the change rate of the magnetic flux and further improve the energy collection efficiency, thus further meeting the application requirements in the low-frequency and micro vibration field.

In an optical solution of this embodiment, preferably, the coil assembly 20 includes a magnetic flux concentrator 21, a coil 22, and a first elastic member 23. The coil 22 sleeves on the middle of the magnetic flux concentrator 21. The first elastic member 23 is connected to the housing 10 and the magnetic flux concentrator 21. The magnetic flux concentrator 22 is configured to be passed through by magnetic induction lines 33, and the coil 22 is configured to output an induced electromotive force 24 for storage or use by electrical devices.

The magnetic flux concentrator 21 is configured to move linearly with respect to the housing 10 and the magnetic field generator 30 under the action of the external vibration 2 and elastically deform the first elastic member 23 The magnetic flux concentrator 21 can reciprocate linearly under the action of the external vibration 2 and/or a restoring force of the first elastic member 23, that is, the energy of the external vibration 2 can be partially converted into elastic potential energy of the first elastic member 23, and the elastic potential energy can be released to make the first elastic member 23 reciprocate linearly or match with the external vibration 2 to make the first elastic member 23 reciprocate linearly, thus improving a motion frequency of the magnetic flux concentrator 21, further improving the change rate of the magnetic flux in the magnetic flux concentrator 21 to improve the induced electromotive force 24 generated by the coil 22. The magnetic flux concentrator 21 can drive the magnetic field generator 30 to swing with respect to the magnetic flux concentrator 21. The swinging motion of the magnetic field generator 30 matches with the linear reciprocation of the magnetic flux concentrator 21, thus improving the change rate of the magnetic flux in the magnetic flux concentrator 21 to improve the induced electromotive force 24 generated by the coil 22.

In an optical solution of this embodiment, preferably, the magnetic field generator 30 includes a permanent magnet 31, and a second elastic member 32. The second elastic member 32 is connected to the permanent magnet 31 and the housing 10. The permanent magnet 31 is configured to generate a magnetic field capable of passing through the coil assembly 20.

The coil assembly 20 is configured to reciprocate linearly with respect to the housing 10 and the permanent magnet 31 under the action of the external vibration 2, thus changing the magnetic flux of the coil assembly 20. During the linear reciprocation of the coil assembly 20, the coil assembly 20 can drive the permanent magnet 31 to rotate with respect to the coil assembly 20, and elastically deform the second elastic member 32. The elastic potential energy of the second elastic member 32 can be released and match with the driving of the coil assembly 20, such that the permanent magnet 31 can swing. The swinging motion of the permanent magnet 31 matches with the linear reciprocation of the magnetic flux concentrator 21, thus improving the change rate of the magnetic flux in the magnetic flux concentrator 21 to improve the induced electromotive force 24 generated by the coil 22.

In an optical solution of this embodiment, preferably, the magnetic flux concentrator 21 and the permanent magnet 31 are both vertically arranged. An upper end and a lower end of the permanent magnet 31 are magnetic pole ends 34, which are respectively opposite to an upper end and a lower end of the magnetic flux concentrator 21. There is a gap 35 between each of the upper end and the lower end of the permanent magnet 31 and a corresponding one of the upper end and the lower end of the magnetic flux concentrator 21. Specifically, the magnetic pole end 34 on the upper side of the permanent magnet 31 is an N pole, and the magnetic pole end 34 on the lower side of the permanent magnet 31 is an S pole. The gap 35 is provided to satisfy the space for relative motion, and the size of the gap 35 may be 1-3 mm or even smaller, as long as the magnetic flux concentrator 21 and the permanent magnet 31 do not collide during the coupling swing of the permanent magnet 31. By providing the smaller gap 35, the end surfaces of the magnetic flux concentrator 21 and the permanent magnet 31 are directly opposite to each other, such that a larger induced electromotive force 24 can be generated when a micro relative motion occurs. The first elastic member 23 is arranged below the magnetic flux concentrator 21, and both ends of the first elastic member 23 are connected to the magnetic flux concentrator 21 and the housing 10, respectively, so that the first elastic member 23 can support the vertical motion of the magnetic flux concentrator 21. The second elastic member 32 is arranged on one side, away from the magnetic flux concentrator 21, of the permanent magnet 31, and both ends of the second elastic member 32 are connected to the permanent magnet 31 and the housing 10, respectively, so that the second elastic member 32 can support the vertical swing of the permanent magnet 31. Since the ends of the magnetic flux concentrator 21 and the permanent magnet 31 are opposite to each other, there is a tendency to prevent the relative motion between the magnetic flux concentrator 21 and the permanent magnet 31 under the action of Lorentz force and the second elastic member 32 during the linear reciprocation of the magnetic flux concentrator 21, so that the vertical reciprocation of the magnetic flux concentrator 21 can drive the permanent magnet 31 to move vertically, and the permanent magnet 31 can swing vertically with the support of the second elastic member 32, thereby changing the gap 35 between the ends of the magnetic flux concentrator 21 and the permanent magnet 31. Therefore, the change rate of the magnetic flux in the magnetic flux concentrator 21 is further improved to improve the induced electromotive force 24 generated by the coil 22.

The magnetic flux concentrator 21 is configured to move linearly with respect to the housing 10 and the permanent magnet 31 under the action of the external vibration 2 and elastically deform the first elastic member 23 The magnetic flux concentrator 21 can reciprocate linearly in a vertical direction under the action of the external vibration 2 and/or the restoring force of the first elastic member 23, thus changing the magnetic flux in the magnetic flux concentrator 21. The magnetic flux concentrator 21 can drive the permanent magnet 31 to rotate with respect to the magnetic flux concentrator 21 and elastically deform the second elastic member 32, and the permanent magnet 31 can swing in a vertical plane under the driving of the magnetic flux concentrator 21 and the restoring force of the second elastic member 32, thus changing the magnetic flux in the magnetic flux concentrator 21.

Furthermore, the first elastic member 23 and the second elastic member 32 are both springs, or steel, thus guaranteeing the service life thereof.

In an optical solution of this embodiment, preferably, the swing-enhanced vibration energy harvesting device 1 provided by this embodiment further includes a rigid connector 40. The rigid connector 40 is connected to an upper side of the magnetic flux concentrator 21, and the rigid connector 40 is configured to receive the external vibration 2 and drive the magnetic flux concentrator 21 to move linearly in the vertical direction. The external vibration 2 transmits vibration to the magnetic flux concentrator 21 through the rigid connector 40, thus driving the magnetic flux concentrator 21 to reciprocate linearly. Specifically, the rigid connector 40 includes a connecting rod, and is fixedly connected to the upper side of the magnetic flux concentrator 21.

In an optical solution of this embodiment, preferably, the swing-enhanced vibration energy harvesting device 1 provided by this embodiment further includes a limiting component 50, which is arranged on the housing 10. The limiting component 50 is configured to limit the permanent magnet 31 in a horizontal direction perpendicular to a swing direction of the permanent magnet 31. The limiting component 50 is provide to limit the shaking of the permanent magnet 31 in the horizontal direction to avoid excessive shaking of the permanent magnet 31, and guide the vertical shaking of the permanent magnet 31, which makes the magnetic flux concentrator 21 and the permanent magnet 31 to move with respect to each other to change the magnetic flux.

Specifically, the limiting component 50 is arranged as a gantry, and the bottom of the gantry is fixedly connected to the housing 10. Both sides of the gantry can limit the permanent magnet 31 in the horizontal direction perpendicular to the swing direction of the permanent magnet 31 to avoid excessive shaking of the permanent magnet 31. Furthermore, buffer pads can be arranged on inner walls of both sides of the gantry to avoid collision and damage.

Furthermore, an upper side of the housing 10 is open, the coil assembly 20 and the magnetic field generator 30 are arranged within the housing 10, and the housing 10 may play a role of protection.

In an optical solution of this embodiment, preferably, each of the housing 10, the rigid connector 40 and the limiting component 50 is made of an aluminum alloy material, or a plastic material, thus reducing the interference on the magnetic induction lines 33.

In an optical solution of this embodiment, preferably, the magnetic flux concentrator 21 is a soft magnetic core made of a high magnetic permeability material, such as silicon steel, ferrite, nickel-iron alloy, manganese-zinc ferrite, or permalloy. The magnetic flux concentrator 21 has super magnetic permeability, and can introduce more magnetic field lines to pass through the coil 22.

Figure 6:
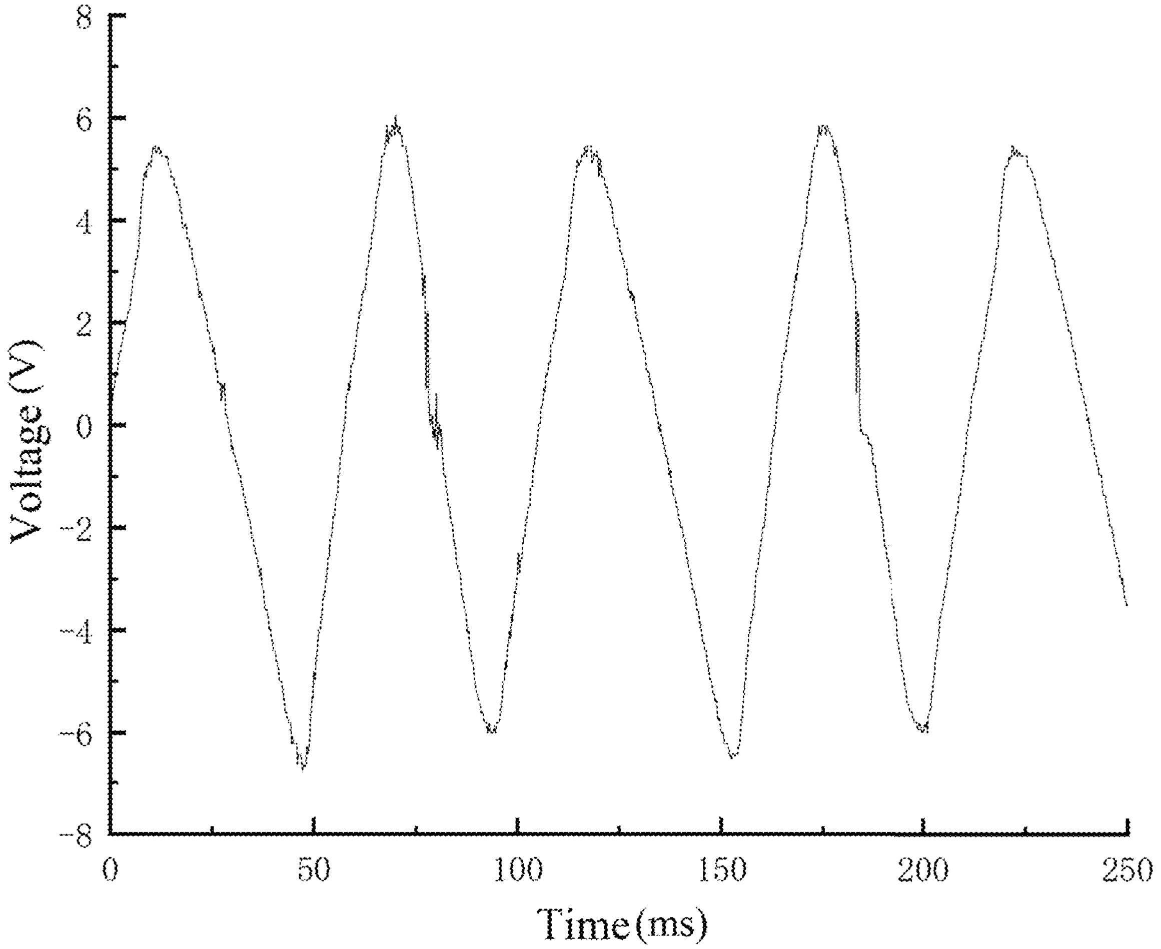
FIG. 6 is a voltage output waveform diagram of a swing-enhanced vibration energy harvesting device according to Embodiment 1.
Figure 7:
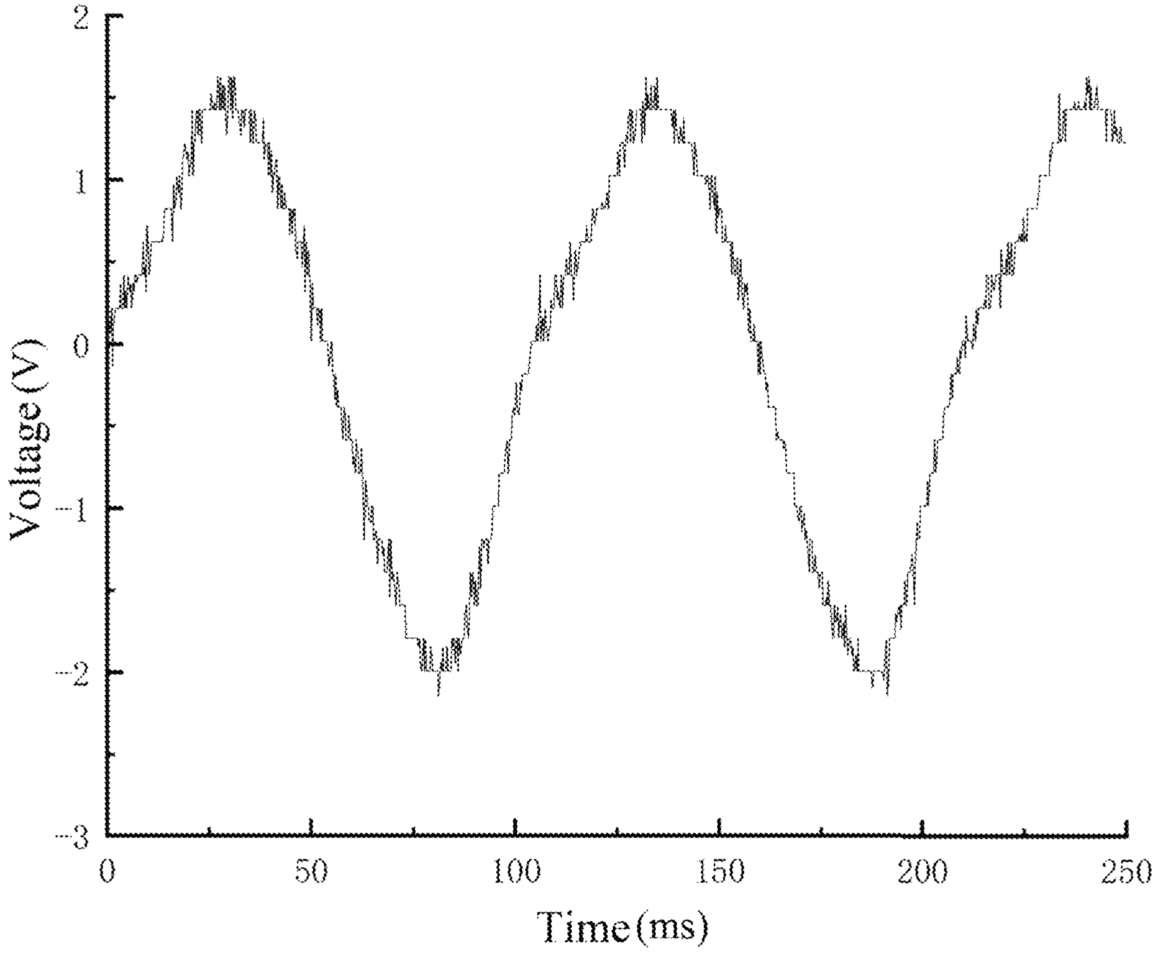
FIG. 7 is a voltage output waveform diagram of a swing-enhanced vibration energy harvesting device according to Embodiment 1 without a first elastic member and a second elastic member.
Figure 8:
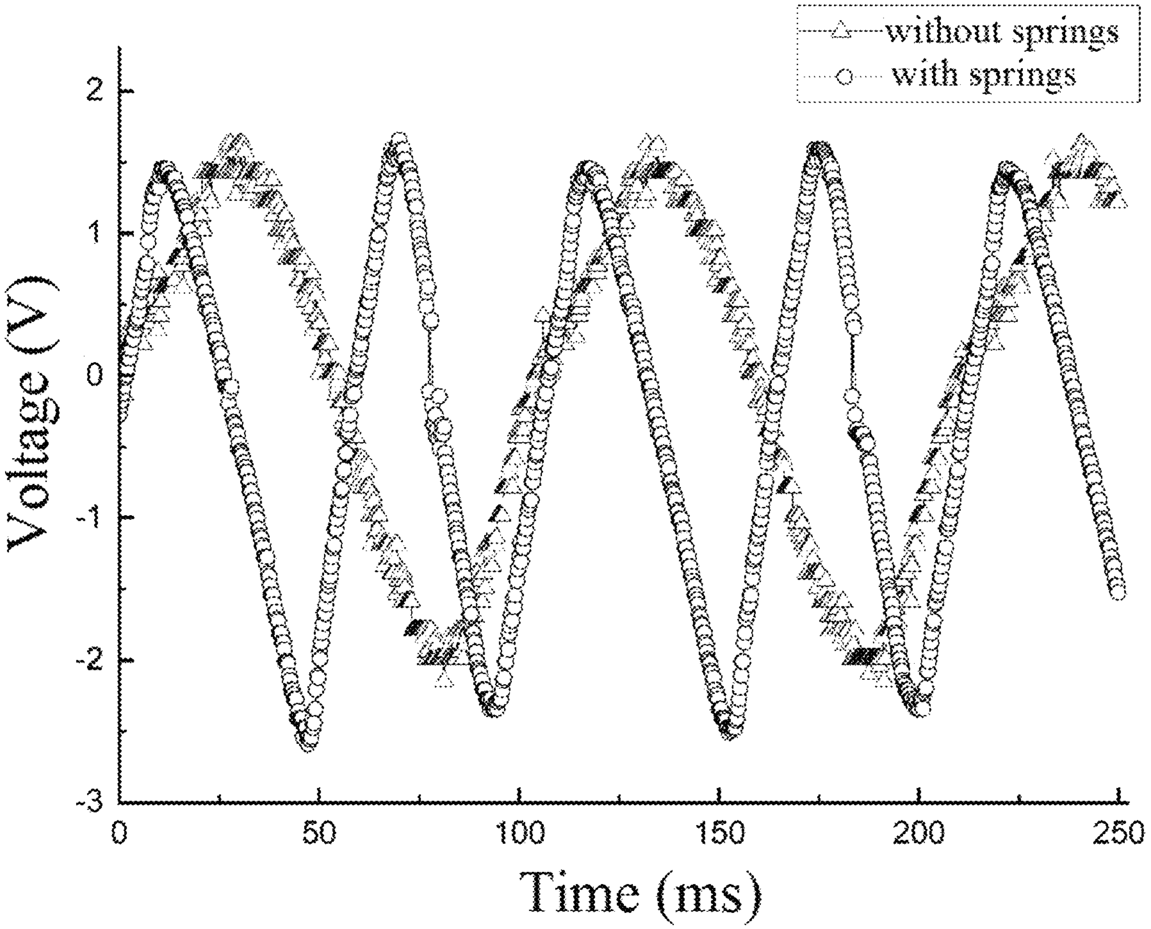
FIG. 8 is a comparison diagram of voltage outputs of a swing-enhanced vibration energy harvesting device according to Embodiment 1 without a first elastic member and a second elastic member and a swing-enhanced vibration energy harvesting device according to Embodiment 1 in a same frequency and amplitude condition.

Specifically, referring to FIG. 6 and FIG. 7, under the action of the same external vibration 2, the swing-enhanced vibration energy capture device 1 provided by this embodiment (hereafter referred to as vibration energy capture device A) is compared with a swing-enhanced vibration energy capture device 1 provided by this embodiment without the first elastic member 23 and the second elastic member 32 (hereafter referred to as vibration energy capture device B), which can only reciprocate linearly, as can be seen from waveform diagrams of output voltages, the peak voltage and output frequency of the vibration energy capture device A is greater than the vibration energy capture device B. It can be seen that the vibration energy capture device A can improve the energy harvesting efficiency. In addition, referring to FIG. 8, taking the vibration energy capture device B, i.e. a swing-enhanced vibration energy capture device 1 provided by this embodiment without springs as a comparative example, in the same frequency and amplitude condition, the voltage output frequency of the vibration energy capture device A increases, thus improving the efficiency of electromagnetic power generation.

Embodiment 2

This embodiment provides a swing-enhanced vibration energy harvesting device 1, including a housing 10, a coil assembly 20, and a magnetic field generator 30. The coil assembly 20 is movably arranged on the housing 10. The magnetic field generator 30 is movably arranged on the housing 10 and placed on one side of the coil assembly 20, and the magnetic field generator 30 is configured to generate a magnetic field capable of passing through the coil assembly 20.

The magnetic field generator 30 is configured to reciprocate linearly with respect to the housing 10 and the coil assembly 20 under the action of external vibration 2, thus changing the magnetic flux of the coil assembly 20. The magnetic field generator 30 can drive the coil assembly 20 to swing with respect to the magnetic field generator 30, thus changing the magnetic flux of the coil assembly 20.

The difference from the swing-enhanced vibration energy capture device 1 provided by Embodiment 1 lies in that the positions of the permanent magnet 31 and the magnetizer 21 are interchanged, and the coil 22 is arranged on the magnetic flux concentrator 21, that is, the permanent magnet 31 is supported by the first elastic member 23, and the magnetic flux concentrator 21 is supported by the second elastic member 31, such that the permanent magnet 31 can reciprocate linearly, and the magnetic flux concentrator 21 can swing. The remaining structures in the Embodiment 2 are the same as those in the Embodiment 1, and thus will not be described in detail here.

Specifically, the magnetic field generator 30 is configured to reciprocate linearly with respect to the housing 10 and the magnetic flux concentrator 21 under the action of external vibration 2 to change the magnetic flux in the magnetic flux concentrator 21. The magnetic field generator 30 can drive the magnetic flux concentrator 21 to rotate with respect to the magnetic field generator 30 and elastically deform the second elastic member 32, and the magnetic flux concentrator 21 can swing under the driving of the magnetic field generator 30 and under the action of the restoring force of the second elastic member 32, thus changing the magnetic flux in the magnetic flux concentrator 21. Furthermore, the permanent magnet 31 linearly moves with respect to the housing 10 and the coil assembly 20 under the action of the external vibration 2 and elastically deforms the first elastic member 23, and the permanent magnet 31 can reciprocate linearly under the action of the external vibration 2 and/or the restoring force of the first elastic member 23 to change the magnetic flux of the coil assembly 20. Moreover, the permanent magnet 31 can drive the coil assembly 20 to swing with respect to the permanent magnet 31 to change the magnetic flux of the coil assembly 20.

Specific examples are used herein for illustration of the principles and embodiments of the present disclosure. The description of the embodiments is merely used to help illustrate the method and its core principles of the present disclosure. In addition, those ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A swing-enhanced vibration energy harvesting device, comprising:

a housing;

a coil assembly, movably arranged on the housing; and a magnetic field generator movably arranged on the housing and placed on one side of the coil assembly, wherein the magnetic field generator is configured to generate a magnetic field capable of passing through the coil assembly, wherein the coil assembly is configured to reciprocate linearly with respect to the housing and the magnetic field generator under an action of an external vibration, so as to change magnetic flux of the coil assembly; the coil assembly is able to drive the magnetic field generator to swing with respect to the coil assembly, so as to change the magnetic flux of the coil assembly; or the magnetic field generator is configured to reciprocate linearly with respect to the housing and the coil assembly under an action of an external vibration, so as to change magnetic flux of the coil assembly; and the magnetic field generator is able to drive the coil assembly to swing with respect to the magnetic field generator, so as to change the magnetic flux of the coil assembly.

2. The swing-enhanced vibration energy harvesting device according to claim 1, wherein the coil assembly comprises:

a magnetic flux concentrator, a coil, and a first elastic member, wherein the coil sleeves on a middle of the magnetic flux concentrator; the first elastic member is connected to the housing and the magnetic flux concentrator; the magnetic flux concentrator is configured to be passed through by magnetic induction lines, and the coil is configured to output an induced electromotive force;

the magnetic flux concentrator is configured to move linearly with respect to the housing and the magnetic field generator under the action of the external vibration and elastically deform the first elastic member, the magnetic flux concentrator is able to reciprocate linearly under the action of the external vibration and/or an action of a restoring force of the first elastic member, so as to change magnetic flux in the magnetic flux concentrator;

the magnetic flux concentrator is able to drive the magnetic field generator to swing with respect to the magnetic flux concentrator, so as to change the magnetic flux in the magnetic flux concentrator; or the magnetic field generator is configured to reciprocate linearly with respect to the housing and the magnetic flux concentrator under the action of the external vibration, so as to change magnetic flux in the magnetic flux concentrator; the magnetic field generator is able to drive the magnetic flux concentrator to rotate with respect to the magnetic field generator and elastically deform the first elastic member; and the magnetic flux concentrator is able to swing under driving of the magnetic field generator and an action of a restoring force of the first elastic member, so as to change the magnetic flux in the magnetic flux concentrator.

3. The swing-enhanced vibration energy harvesting device according to claim 2, wherein the magnetic field generator comprises:

a permanent magnet, and a second elastic member;

wherein the second elastic member is connected to the permanent magnet and the housing, and the permanent magnet is configured to generate a magnetic field capable of passing through the coil assembly;

the coil assembly is configured to reciprocate linearly with respect to the housing and the permanent magnet under the action of the external vibration, so as to change the magnetic flux of the coil assembly;

the coil assembly is able to drive the permanent magnet to rotate with respect to the coil assembly and elastically deform the second elastic member, and the permanent magnet is able to swing under driving of the coil assembly and action of a restoring force of the second elastic member, so as to change the magnetic flux in the coil assembly; or the permanent magnet is configured to move linearly with respect to the housing and the coil assembly under the action of the external vibration and elastically deform the second elastic member; the permanent magnet is able to reciprocate linearly under the action of the external vibration and/or action of a restoring force of the second elastic member, so as to change the magnetic flux of the coil assembly; and the permanent magnet is able to drive the coil assembly to swing with respect to the permanent magnet, so as to change the magnetic flux of the coil assembly.

4. The swing-enhanced vibration energy harvesting device according to claim 3, wherein the magnetic flux concentrator and the permanent magnet are vertically arranged;

an upper end and a lower end of the permanent magnet are magnetic pole ends, which are respectively opposite to an upper end and a lower end of the magnetic flux concentrator, with a gap between each of the upper end and the lower end of the permanent magnet and a corresponding one of the upper end and the lower end of the magnetic flux concentrator;

the first elastic member is arranged below the magnetic flux concentrator, and both ends of the first elastic member are connected to the magnetic flux concentrator and the housing, respectively;

the second elastic member is arranged on one side, away from the magnetic flux concentrator, of the permanent magnet, and both ends of the second elastic member are connected to the permanent magnet and the housing, respectively;

the magnetic flux concentrator is configured to move linearly with respect to the housing and the permanent magnet under the action of the external vibration and elastically deform the first elastic member;

the magnetic flux concentrator is able to reciprocate linearly in a vertical direction under the action of the external vibration and/or the action of the restoring force of the first elastic member, so as to change the magnetic flux in the magnetic flux concentrator;

the magnetic flux concentrator is able to drive the permanent magnet to rotate with respect to the magnetic flux concentrator and elastically deform the second elastic member, and the permanent magnet is able to swing in a vertical plane under driving of the magnetic flux concentrator and the action of the restoring force of the second elastic member, so as to change the magnetic flux in the magnetic flux concentrator.

5. The swing-enhanced vibration energy harvesting device according to claim 4, further comprising a rigid connector, wherein the rigid connector is connected to an upper side of the magnetic flux concentrator, and the rigid connector is configured to receive the external vibration, and drive the magnetic flux concentrator to move linearly in the vertical direction.

6. The swing-enhanced vibration energy harvesting device according to claim 5, further comprising a limiting component arranged on the housing, wherein the limiting component is configured to limit the permanent magnet in a horizontal direction perpendicular to a swing direction of the permanent magnet.

7. The swing-enhanced vibration energy harvesting device according to claim 6, wherein each of the housing, the rigid connector and the limiting component is made of an aluminum alloy material, or a plastic material.

8. The swing-enhanced vibration energy harvesting device according to claim 4, wherein the magnetic flux concentrator is arranged as a soft magnetic core.

* * * * *